United States Patent [19]
Pritsker

[11] Patent Number: 6,016,744
[45] Date of Patent: Jan. 25, 2000

[54] METHODS AND DEVICES FOR COOKING POULTRY

[76] Inventor: Robert Pritsker, 422 Marion Ave., Mill Valley, Calif. 94941

[21] Appl. No.: 08/895,332

[22] Filed: Jul. 16, 1997

[51] Int. Cl.[7] .............................. A47J 37/04; A47J 43/18
[52] U.S. Cl. ........................... 99/421 R; 99/419; 99/426; 426/523; 426/132
[58] Field of Search .......................... 99/426, 419, 421 R, 99/421 HH; 294/67.33, 168, 34; 211/125, 201, 85.4; 248/298.1, 500, 505, 216.1, 217.3; 426/523, 132

[56] References Cited

U.S. PATENT DOCUMENTS

| | | |
|---|---|---|
| 849,290 | 4/1907 | Vanderbilt .................................. 99/426 |
| 1,205,774 | 11/1916 | Mitchell ................................ 99/426 X |
| 2,850,962 | 9/1958 | Beavers ...................................... 99/426 |
| 4,293,977 | 10/1981 | Volk et al. . |
| 4,421,017 | 12/1983 | Ross . |
| 4,518,083 | 5/1985 | Mayer, Jr. . |
| 4,653,146 | 3/1987 | Volk . |
| 4,739,538 | 4/1988 | Volk . |
| 4,771,509 | 9/1988 | Volk . |
| 5,102,370 | 4/1992 | Volk . |
| 5,181,880 | 1/1993 | Volk . |
| 5,279,519 | 1/1994 | Volk . |
| 5,292,277 | 3/1994 | Volk et al. . |
| 5,423,720 | 6/1995 | Volk . |
| 5,558,222 | 9/1996 | Volk et al. . |
| 5,638,742 | 6/1997 | Kassaseya ................................. 99/426 |

*Primary Examiner*—Reginald L. Alexander
*Attorney, Agent, or Firm*—Jens E. Hoekendijk

[57] ABSTRACT

A poultry retainer for retaining poultry has a strap for closing the rear opening of the poultry and a piercing member for piercing the skin and holding the skin over the front opening to close the front opening. The poultry retainer also includes a base having first and second pieces which are slidably connected together to provide an adjustable distance between the strap and piercing member for accommodating varying size poultry. Wing holders and a leg clip draw the wings and legs toward the body of the poultry to reduce drying of the wings and legs during cooking.

27 Claims, 2 Drawing Sheets

METHODS AND DEVICES FOR COOKING POULTRY

BACKGROUND OF THE INVENTION

The present invention relates to methods and devices for cooking poultry. A preferred method of cooking poultry is roasting, however, any other method may also be used with the present invention without departing from the scope of the invention.

When roasting poultry, juices within the poultry are released. When properly roasted, these juices are retained within the poultry to produce a juicy product. As will be explained below, improper roasting often results in undesirably dry and tough poultry.

A common method of cooking poultry is to simply place the unrestrained poultry in a roasting pan and roast the poultry in an oven. A problem with this method is that the internal cavity of the poultry is exposed through the rear and front openings in the poultry. The relatively large, internal cavity walls expose the poultry to excessive drying since the hot oven air easily passes through the front and rear openings. Another problem with simply placing the unrestrained poultry in a roasting pan is that the legs and wings stand away from the body which causes drying of the overly exposed legs and wings. Thus, simply placing unrestrained poultry in a pan and roasting the poultry may produce undesirably dry and tough poultry.

Another conventional method of preparing poultry for roasting is to "truss" the poultry with cord. The cord is wrapped around the poultry to close the front and rear openings thereby preventing exposure of the internal cavity. The cord is also wrapped around the poultry to draw the legs and wings toward the body so that they are not overly exposed thereby reducing drying of the legs and wings. Finally, the cord is also wrapped around the poultry to generally compress the poultry to further minimize the exposed surface area relative to the volume of the poultry.

A problem with the conventional method of trussing poultry with cord is that the procedure is time-consuming and requires skill to truss the poultry properly. Due to the time and difficulties involved with the conventional method of trussing with cord, roasting of poultry is often performed without trussing which leads to the problems described above. Another problem with trussing poultry with cord is that the cord often burns and breaks thereby freeing the extremities and/or allowing the front and rear openings to open.

Thus, it is an object of the present invention to provide improved methods and devices for cooking poultry.

SUMMARY OF THE INVENTION

In accordance with the object of the invention, the present invention provides improved methods and devices for cooking poultry. In a preferred method of cooking poultry, a poultry retainer is provided which has a base, a strap, and a first piercing member. The base has first and second pieces which are slidably coupled together so that the distance between the first piercing member and strap can be adjusted to accommodate varying size poultry.

The poultry is mounted to the poultry retainer with the base extending along an exterior portion of the poultry. The skin is pulled over the front opening and the first piercing member pierces the neck to hold the skin over the front opening thereby closing the front opening. The strap is tightened around the poultry around the rear opening below, and independent of, the legs of the poultry to close the rear opening. Thus, the first piercing member and strap cooperate to close the front and rear openings respectively.

In a preferred embodiment of the poultry retainer, the base also has second and third piercing members which, together with the first piercing member, stabilize the poultry on the base and ensure that the skin remains attached to the body during cooking. The second and third piercing members are preferably positioned to pierce the breasts but may be positioned in any other position to stabilize the poultry on the base.

The poultry retainer also preferably has wing holders and a leg pin. The wing holders hold the wings against the body to minimize exposure of the wings. The poultry retainer also has a leg pin which draws the legs toward the body and puts the legs in a traditional presentation position. The leg pin has two sharp ends which pierce the poultry near the joint connecting the leg and thigh. The leg pin also helps ensure, and in some cases completes, closure of the rear opening since the leg pin pulls the legs toward one another which acts to close the rear opening.

The poultry retainer also preferably has a removable handle and removable turning fork for transferring the poultry to and from the oven and for turning the poultry in the oven. The handle and turning fork are removable so that the poultry retainer fits within a conventional, domestic oven.

These and other aspects of the present invention will become clear with the following description of the preferred embodiment. The description below illustrates a preferred embodiment, however, many other embodiments are possible which fall within the scope of the invention. Therefore, the description of the preferred embodiment does not limit the scope of the invention as defined by the claims.

DESCRIPTION OF THE PREFERRED EMBODIMENTS

Figure 1:
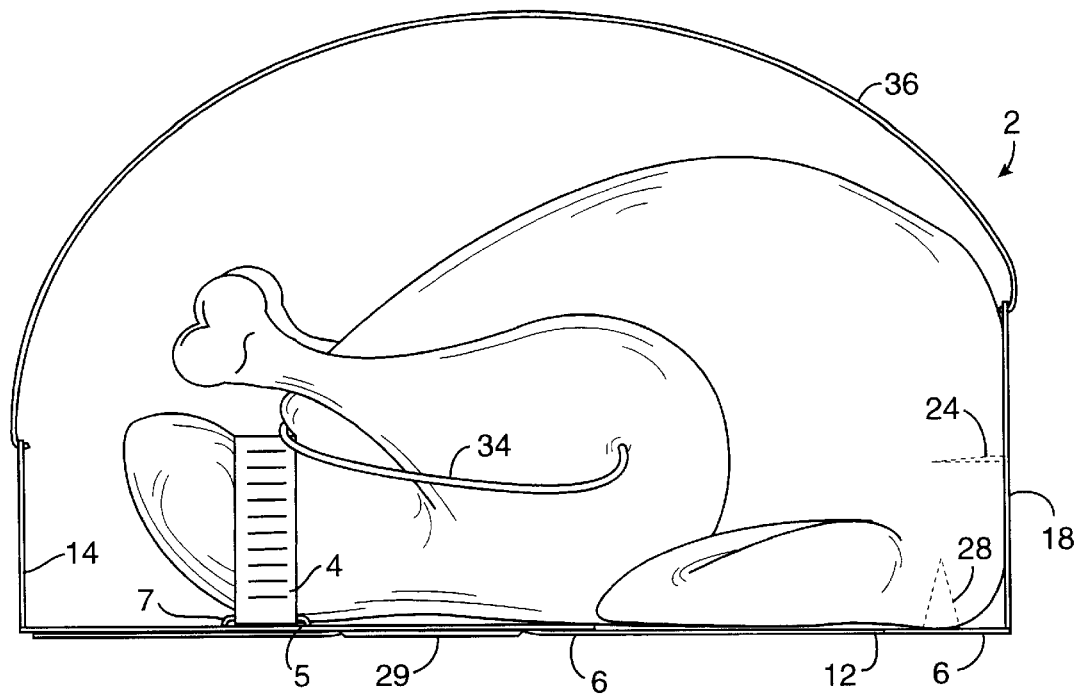
FIG. 1 shows a preferred embodiment of a poultry retainer of the present invention.
Figure 2:
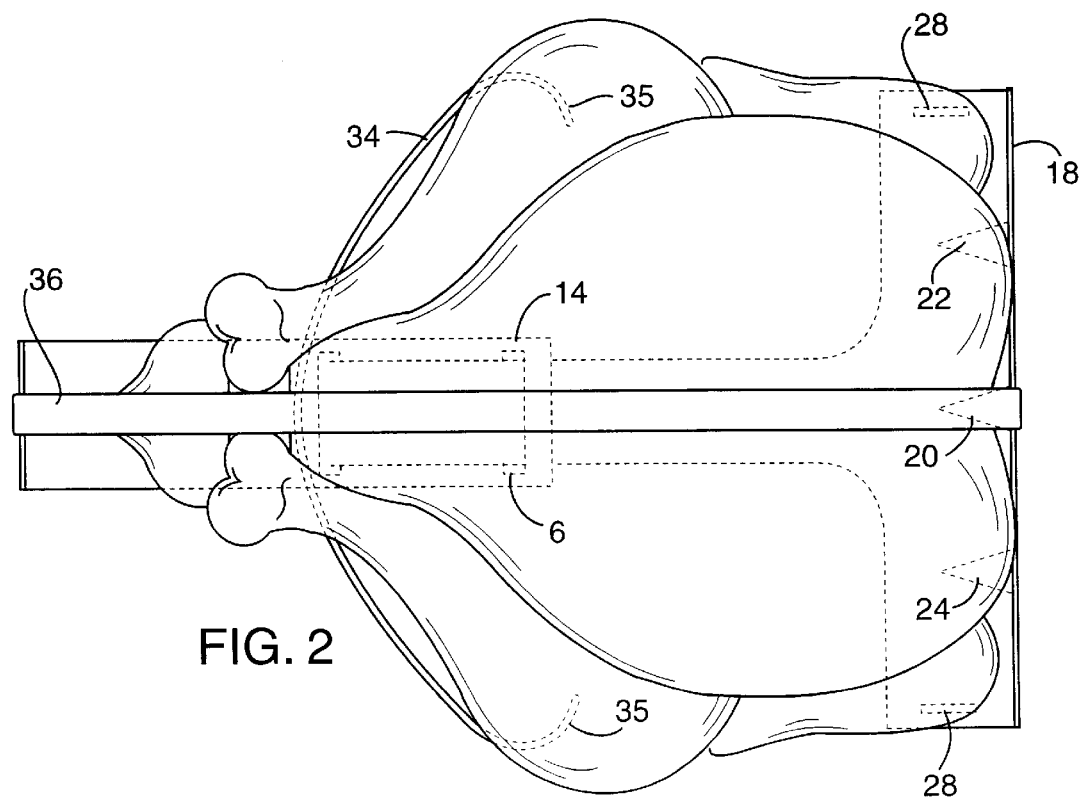
FIG. 2 shows a plan view of the poultry retainer.
Figure 3:
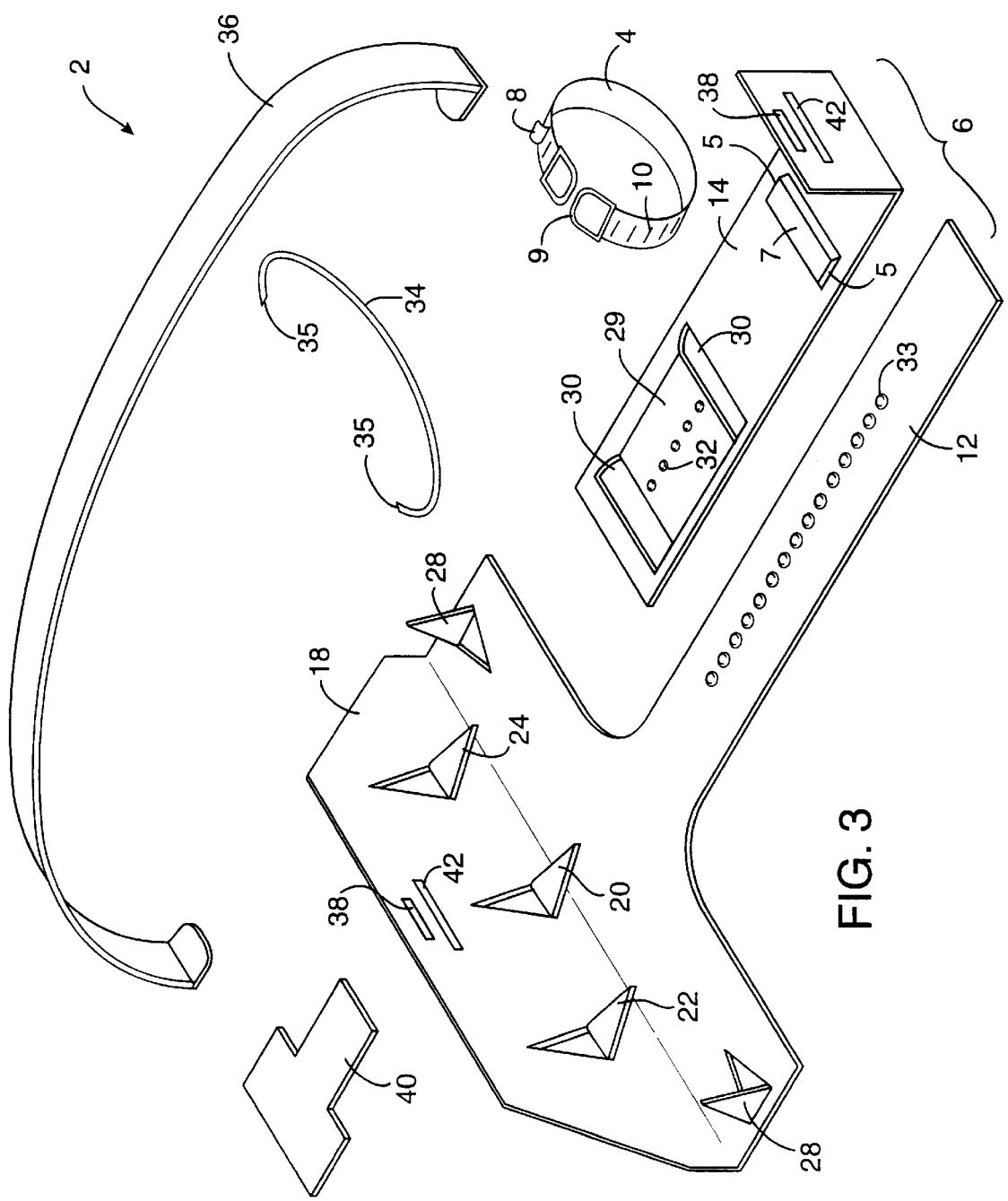
FIG. 3 shows an isometric, exploded view of the poultry retainer of FIGS. 1 and 2.

A poultry retainer 2 according to the present invention is shown in FIGS. 1–3. The poultry retainer 2 may be used to retain any type of poultry and FIG. 1 shows the poultry retainer 2 holding a chicken.

The poultry retainer 2 has a strap 4 and a base 6. Referring to FIGS. 1 and 3, the strap 4 forms a closed loop having an adjustable size so that the strap 4 can be tightened around the poultry to close the rear opening. The strap 4 passes through a pair of openings 5 in the base 6. A raised portion 7 between the openings 5 facilitates sliding of the strap 4 through the openings 5.

The strap 4 has a hook 8 which engages any one of a number of slots 10. Fingerloops 9 at the ends of the strap 4 are provided for easy manipulation and tightening of the strap 4. As will be described below, the strap 4 closes the rear opening to prevent exposure of the internal cavity when cooking the poultry. The strap 4 may take any other suitable form including a cinch, a belt-like member, or a piece of cord which is simply tied in a knot. The strap 4 is preferably reusable, however, the strap 4 may also be disposable and replaced after each use of the poultry retainer 2.

The base 6 has an end plate 18 having first, second and third piercing members 20, 22, 24 extending therefrom for piercing the poultry. The first piercing member 20 pierces the skin and neck to hold the skin over the front opening. The second and third piercing members 22, 24 pierce the breasts and, together with the first piercing member 20, stabilize the poultry on the poultry retainer 2 and make sure that the skin remains attached to the poultry during cooking. The end plate 18 may also be used to compress the front end of the poultry to further compact the poultry, however, it may be preferred to space the poultry from the end plate so that the skin is not covered during cooking. Although it is preferred to provide triangular piercing members 20, 22, 24, the piercing members 20, 22, 24 may be shaped in any other manner such as a skewer, knife or fork.

The base 6 has first and second pieces 12, 14 which are slidably coupled together to adjust the distance between the piercing members 20, 22, 24 and the strap 4 so that the poultry retainer 2 may be used with varying size poultry. Referring now to FIG. 3, the first piece 12 extends through a pair of openings 30 in the second piece 14 to provide the sliding engagement between the first and second pieces 12, 14. The second piece 14 has a recessed portion 29 between the openings 30 so that the first piece 12 is not overly deformed when passing through the openings 30. The first and second pieces 12, 14 may also be slidably coupled together in any other manner without departing from the scope of the invention. For example, the slidable connection could be an I-shaped, L-shaped or T-shaped rail cooperating with a slot, a hoop and cylinder arrangement, or a pin and slot configuration. Furthermore, although the base 6 preferably has a generally T-shaped configuration, the base 6 may take any other shape including a square frame having two slidable sides or a circular support frame with slidable bars supported by the frame.

The second piece 14 has knobs 32 which engage knobs 33 on the first piece 12 to lock the first and second pieces 12, 14 together. The sliding engagement between the first and second pieces 12, 14 is preferably resisted by a modest frictional resistance so that manual manipulation of the first and second pieces 12, 14 is required to slidably move the first and second pieces 12, 14. The frictional resistance is greatest when the knobs 32 register with the knobs 33 so that the first and second pieces 12, 14 can be locked in a number of discrete positions. An alternative would be to provide a manually-operable locking mechanism such as a clamp, pin, twist-lock, frictional lock, ratcheting mechanism or by coupling locking the locking mechanism to tightening of the strap.

Wing holders 28 extend from the first piece 12 for pressing the wings against the body to prevent drying of the wings. The wing holders 28 are preferably integrally formed with the first piece 12, however, the wing holders 28 may also be slidably coupled to the base 6 for adjusting the distance between the wing holders 28. As shown in FIGS. 1 and 2, the wing holders 28 pierce the wings and hold the wings against the body. The wing holders 28 may also be resiliently coupled to the base 6 so that they press the wings against the body with a modest force. Yet another alternative is to provide independent wing clips which pierce a portion of the wing and a portion of the body to draw the wings toward the body. A final alternative would be to provide another strap similar to the strap 4 to draw the wings toward the body.

The poultry retainer 2 also includes a leg clip 34 which draws the legs toward the body to minimize exposure of the legs and to put the poultry in a traditional presentation position. The leg clip 34 is preferably completely independent from the base 6 so that the legs may be positioned independent of the rest of the poultry retainer 2. The leg clip 34 has sharp ends 35 which pierce the poultry near the joint connecting the leg and thigh bones. The leg clip 34 acts to ensure, and in some cases complete, closure of the rear opening since the legs are drawn together in a manner which also closes the rear opening.. The leg clip 34 is preferably C-shaped, however, any other appropriate clip may be used to draw the legs toward the body.

A removable handle 36 engages slots 38 in the base 6 for carrying the poultry to and from the oven. The handle 3 is flexible and is expanded slightly to engage the slots 38. A turning fork 40 engages openings 42 in the base 6 for turning the poultry during roasting. The turning fork 40 and handle 36 are removable so that the poultry retainer 2 may be used in conventional, domestic ovens without interference from the handle 36 or turning fork 40. The turning fork 40 provides an advantage over a conventional turning fork since the conventional turning fork must pierce the poultry which tears the flesh and releases juices.

A method of cooking poultry, preferably by roasting, is now described. The method is described in connection with the preferred poultry retainer 2 described above, however, any other poultry cooking device may be used with the method described below without departing from the scope of the invention. The first and second pieces 12, 14 are adjusted to provide a distance between the strap 4 and first, second and third piercing members 20, 22, 24 large enough to accommodate installation of the poultry to be cooked. The poultry is then positioned with the back onto the base 6 and the poultry is pushed into engagement with the first, second and third piercing members 20, 22, 24. The skin of the poultry is held over the neck when piercing the poultry so that the first piercing member 20 holds the skin over the front opening thereby closing the front opening. The first piercing member 20 preferably pierces the neck and the second and third piercing members 22, 24 pierce the breasts.

The strap 4 is then opened to a size large enough to receive the rear end of the poultry and the strap 4 is slid around the end of the poultry taking advantage of the slidable connection between the first and second pieces 12, 14. The strap 4 is positioned anatomically below, and independent from, the legs. The strap 4 is then tightened using the fingerloops 9 to close the rear opening and thereby preventing exposure of the internal cavity.

In a preferred method and apparatus of the present invention, the wings are pressed against the body of the poultry with the wings holders 28 to prevent drying of the wings. The wings are preferably folded under the body in a manner known as akimbo. As mentioned above, the wing holders 28 may be configured in any other manner to draw the wings toward the body of the poultry. The legs of the poultry are then drawn together using the leg clip 34. The leg clip 34 ensures, and in some cases completes, closure of the rear opening and puts the legs in a traditional presentation position.

The poultry is then brought to the oven with the handle 36, the handle 36 is removed, and the poultry is roasted. The turning fork 40 is used to turn the poultry during roasting. An advantage of the poultry retainer 2 is that the poultry may be easily turned during roasting without opening the front and rear openings or freeing the legs and wings. After roasting, the handle 36 is used to transfer the poultry to a serving dish. The poultry may be served in the poultry retainer 2, after removing the handle 36, or removed from the poultry retainer 2 for serving.

The methods and devices disclosed herein have been described in conjunction with roasting of poultry, however, it is understood that the methods and apparatus may also be used for cooking poultry in any other manner such as braising, poaching, barbequing, boiling or steaming. While the above is a preferred description of the invention, various alternatives, modifications and equivalents may be used without departing from the scope of the invention. Therefore, the above description should not be taken as limiting the scope of the invention which is defined by the claims.

What is claimed is:

1. A method of cooking poultry, comprising the steps of:

providing a poultry retainer having a strap, a base, and a first piercing member, the strap and first piercing member being coupled to the base;

tightening the strap around the poultry so that the strap closes a rear opening in the poultry;

piercing a portion of a poultry with the first piercing member so that a neck opening in the poultry is closed, the base extending along an exterior portion of the poultry between the first piercing member and the strap; and heating the poultry to cook the poultry.

2. The method of claim 1, further comprising the steps of:

positioning the poultry in an oven during the heating step, the poultry being supported by a substantially flat portion of the base;

the providing step being carried out with the flat portion having a surface area of at least 4 inches$^2$.

3. The method of claim 1, wherein:

the providing step is carried out with the poultry retainer having second and third piercing members; and the piercing step is carried out with the second and third piercing members piercing the breasts of the poultry.

4. The method of claim 1, wherein:

the piercing step is carried out with the piercing member piercing the skin so that the skin closes the neck opening of the poultry.

5. The method of claim 1, wherein:

the providing step is carried out with the base having a first piece and a second piece, the first piece being slidably coupled to the second piece, the first piece having the first piercing member mounted thereto and the second piece having the strap mounted thereto.

6. The method of claim 1, further comprising the step of:

drawing the legs of the poultry together with a leg pin, the leg pin being independent from the base and strap.

7. The method of claim 1, further comprising the steps of:

providing the poultry retainer with wing holders; and holding the wings against the body of the poultry with the wing holders.

8. The method of claim 1, further comprising the step of:

locking the first piece to the second piece to resist slidable movement therebetween.

9. A method of cooking poultry, comprising the steps of:

providing a poultry retainer having a strap, a base, and a piercing member, the strap and piercing member being coupled to the base, the strap forming a closed loop having an adjustable size;

positioning the back of the poultry on the base, the base extending along an exterior portion of the poultry from the strap toward the piercing member;

tightening the strap around the poultry so that the strap closes a rear opening in the poultry;

piercing a portion of the poultry with the piercing member to stabilize the poultry on the base, and heating the poultry to cook the poultry.

10. The method of claim 9, wherein:

the piercing step is carried out with the piercing member piercing a breast of the poultry.

11. The method of claim 9, wherein:

the piercing step is carried out so that the first piercing member penetrates the skin and the body at a location so that the skin closes the neck opening of the poultry.

12. The method of claim 11, wherein:

the piercing step is carried out by passing the first piercing member into the neck of the poultry.

13. The method of claim 9, wherein:

the providing step is carried out with the first piercing member and strap being slidably movable relative to one another.

14. The method of claim 9, further comprising the step of:

drawing the wings toward the body of the poultry.

15. The method of claim 9, further comprising the step of:

drawing the legs of the poultry together with a leg pin.

16. A poultry retainer for retaining poultry for cooking, comprising: a base having a first piece and a second piece, the first piece having a piercing member attached thereto for piercing a portion of the poultry, the second piece having a strap mounted thereto, the strap having an adjustable length for extending around the poultry and applying a compressive force to the poultry, the first piece being linearly slidable relative to the second piece so that a distance between the strap and the piercing member may be adjusted for varying size poultry.

17. The poultry retainer of claim 16, further comprising: means for locking the first and second pieces together.

18. The poultry retainer of claim 16, further comprising: a handle removably coupled to at least one of the first and second pieces.

19. The poultry retainer of claim 16, further comprising:

a wing holder coupled to the base, the wing holder holding the wings against the body of the poultry.

20. The poultry retainer of claim 16, further comprising:

a second piercing member, the second piercing member being positioned to pierce a breast of the poultry.

21. A poultry retainer for retaining poultry for cooking, the poultry having a back, a neck opening, a rear opening, and a breast, the poultry retainer comprising:

a base for supporting the back of the poultry during cooking, the base extending from a front end to a rear end;

a strap coupled to the base and positioned toward the rear end of the base, the strap having an adjustable length for accommodating varying size poultry, the strap being positioned and configured to close the rear opening of the poultry when the back of the poultry is supported by the base; and a first piercing member coupled to the base and positioned toward the front end of the base, the first piercing member extending toward the rear end of the base when the back of the poultry is supported by the base.

22. The poultry retainer of claim 21, wherein:

the base has a first piece and a second piece, the first and second pieces being linearly slidable relative to one another to move the first piercing member toward and away from the rear end of the base;

the strap being attached to the first piece; and the first piercing member being attached to the second piece.

23. The poultry retainer of claim 21, further comprising:

a second piercing member coupled to the base and configured and positioned to pierce the breast of the poultry.

24. The poultry retainer of claim 21, further comprising:
a leg pin configured to draw the legs of the poultry toward the body of the poultry.

25. The poultry retainer of claim 21, wherein:
the first piercing member is configured and positioned to cover the neck opening with skin of the poultry.

26. The poultry retainer of claim 25, wherein:
the first piercing member is configured and positioned to extend into the neck opening of the poultry.

27. The poultry retainer of claim 1 further comprising:
a wing holder coupled to the base, the wing holder holding the wings against the body of the poultry.

* * * * *